United States Patent
Jiang et al.

(10) Patent No.: US 12,466,078 B2
(45) Date of Patent: Nov. 11, 2025

(54) HANDLING APPARATUS, HANDLING METHOD, AND RECORDING MEDIUM

(71) Applicant: KABUSHIKI KAISHA TOSHIBA, Tokyo (JP)

(72) Inventors: Ping Jiang, Kawasaki (JP); Junichiro Ooga, Kawasaki (JP); Haifeng Han, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 91 days.

(21) Appl. No.: 18/442,181

(22) Filed: Feb. 15, 2024

(65) Prior Publication Data
US 2025/0262770 A1    Aug. 21, 2025

(30) Foreign Application Priority Data

Feb. 24, 2023 (JP) .................................. 2023-026861

(51) Int. Cl.
*B25J 9/16* (2006.01)
*B25J 1/02* (2006.01)
(Continued)

(52) U.S. Cl.
CPC .............. *B25J 9/1697* (2013.01); *B25J 1/02* (2013.01); *B25J 9/1612* (2013.01); *B25J 13/02* (2013.01); *B25J 13/08* (2013.01); *B25J 15/0616* (2013.01)

(58) Field of Classification Search
CPC . B25J 9/1697; B25J 1/02; B25J 9/1612; B25J 13/02; B25J 13/08; B25J 15/0616
(Continued)

(56) References Cited

U.S. PATENT DOCUMENTS 7,813,835 B2 * 10/2010 Fujita ..................... B25J 9/1602
901/1
8,837,839 B1 * 9/2014 Huber .................. G06V 10/762
382/284
(Continued)

FOREIGN PATENT DOCUMENTS

JP              6036662 B2    11/2016
JP          2017-30135 A      2/2017
(Continued)

OTHER PUBLICATIONS

Mousavian et al., "6-DOF GraspNet: Variational Grasp Generation for Object Manipulation", Proceedings of the IEEE/CVF International Conference on Computer Vision, 2019, 10 pages.

*Primary Examiner* — Jaime Figueroa
(74) *Attorney, Agent, or Firm* — Oblon, McClelland, Maier & Neustadt, L.L.P.

(57) ABSTRACT

A handling apparatus includes a controller and a picking tool for a target object. The controller calculates surface information about a target object by using a first learning model for estimating the surface information from a feature map. The feature map represents a feature of an input image including the target object. The controller identifies surfaces in the input image from the surface information, and transforms the input image into projection images, each being seen from above a point on each of the surfaces in a normal vector direction. The controller calculates, for each projection image, a grasp posture for gripping the target object by using a second learning model. The controller transforms the grasp posture into a grasp posture in a first coordinate system. The controller calculates a final posture of the picking tool by projecting the grasp posture in the first coordinate system onto the input image.

7 Claims, 12 Drawing Sheets

(51) Int. Cl.
  *B25J 13/02*   (2006.01)
  *B25J 13/08*   (2006.01)
  *B25J 15/06*   (2006.01)

(58) Field of Classification Search
  USPC .............. 700/245–264; 318/568.11–568.25
  See application file for complete search history.

(56) References Cited

U.S. PATENT DOCUMENTS

| | | | | |
|---|---|---|---|---|
| 9,914,213 | B2* | 3/2018 | Vijayanarasimhan | ..................... G06N 3/045 |
| 10,576,630 | B1* | 3/2020 | Diankov | ................ B25J 9/1612 |
| 10,773,382 | B2* | 9/2020 | Bai | ........................ B25J 9/1697 |
| 11,045,946 | B2 | 6/2021 | Eto et al. | |
| 11,069,086 | B2 | 7/2021 | Yokota et al. | |
| 11,308,314 | B2* | 4/2022 | Hashimoto | ............. G06V 40/20 |
| 11,559,885 | B2* | 1/2023 | Humayun | ................. B25J 9/161 |
| 11,565,408 | B2 | 1/2023 | Jiang et al. | |
| 11,648,070 | B2* | 5/2023 | Wilson | .................. A61B 34/20 700/245 |
| 11,745,351 | B2* | 9/2023 | Cristache | ............... G05D 1/648 700/245 |
| 11,787,047 | B2* | 10/2023 | Diankov | ................ B25J 9/1612 700/245 |
| 11,787,050 | B1* | 10/2023 | Kaehler | ................. B25J 11/008 700/253 |
| 11,787,055 | B2* | 10/2023 | Gienger | ................ B25J 9/1666 700/245 |
| 11,878,433 | B2* | 1/2024 | Du | ........................ B25J 9/1669 |
| 11,945,114 | B2* | 4/2024 | Humayun | ................. G06T 7/73 |
| 12,138,805 | B2* | 11/2024 | Sundermeyer | ......... B25J 9/1669 |
| 2004/0243281 | A1* | 12/2004 | Fujita | ....................... B25J 9/161 318/568.12 |
| 2014/0277718 | A1* | 9/2014 | Izhikevich | ............... B25J 9/163 700/250 |
| 2016/0101519 | A1* | 4/2016 | Kopicki | ................. B25J 9/1697 700/254 |
| 2016/0167227 | A1* | 6/2016 | Wellman | .................. B65G 1/10 901/3 |
| 2020/0164505 | A1* | 5/2020 | Boer | ......................... G06T 7/70 |
| 2020/0269422 | A1* | 8/2020 | Huang | .................... G06V 20/64 |
| 2020/0302160 | A1* | 9/2020 | Hashimoto | ............... G06T 7/73 |
| 2020/0316782 | A1* | 10/2020 | Chavez | .................. B25J 9/1697 |
| 2021/0023720 | A1* | 1/2021 | Du | ......................... G06T 7/194 |
| 2022/0016766 | A1* | 1/2022 | Humayun | ................. G06T 7/73 |
| 2023/0108488 | A1* | 4/2023 | Humayun | .............. B25J 9/1612 700/259 |
| 2023/0278198 | A1* | 9/2023 | Wang | ....................... B25J 9/163 700/259 |
| 2023/0321821 | A1* | 10/2023 | Ku | ......................... B25J 9/1697 700/259 |
| 2023/0321825 | A1* | 10/2023 | Kulkarni | ............... B25J 9/1697 700/260 |
| 2023/0321846 | A1* | 10/2023 | Lei | ......................... B65G 47/90 700/245 |

FOREIGN PATENT DOCUMENTS

| | | |
|---|---|---|
| JP | 2018-202550 A | 12/2018 |
| JP | 2020-77231 A | 5/2020 |
| JP | 2021-45811 A | 3/2021 |
| JP | 2021-61014 A | 4/2021 |
| JP | 2021-88019 A | 6/2021 |
| JP | 7000213 B2 | 1/2022 |

\* cited by examiner

FIG.3

| PICKING TOOL NUMBER | TYPE | JOINT INFORMATION | NUMBER OF SUCTION PADS | SUCTION PAD INFORMATION | PINCHING INDEX | PINCHING INDEX INFORMATION | OUTER DIMENSION | CHARACTERISTICS INFORMATION |
|---|---|---|---|---|---|---|---|---|
| TOOL-1 | SUCTION | [ROTATION 1 AXIS] −10 DEGREES TO 70 DEGREES | 5 | PAD DIAMETER PAD COORDINATES PAD TYPE AIR PRESSURE | 0 | NA | 120×120 | FORCE SENSOR EQUIPPED |
| TOOL-2 | SUCTION | NOT AVAILABLE | 1 | PAD DIAMETER PAD COORDINATES PAD TYPE AIR PRESSURE | 0 | NA | 35×35 | FORCE SENSOR EQUIPPED |
| TOOL-3 | SUCTION | NOT AVAILABLE | 2 | PAD DIAMETER PAD COORDINATES PAD TYPE AIR PRESSURE | 0 | NA | 130×80 | FORCE SENSOR EQUIPPED |
| TOOL-4 | PINCH | NOT AVAILABLE | 0 | NA | 2 | FINGER OUTER DIMENSION OPENING WIDTH INSERTABLE LENGTH PINCHING FORCE | 130×60 | FORCE SENSOR EQUIPPED |

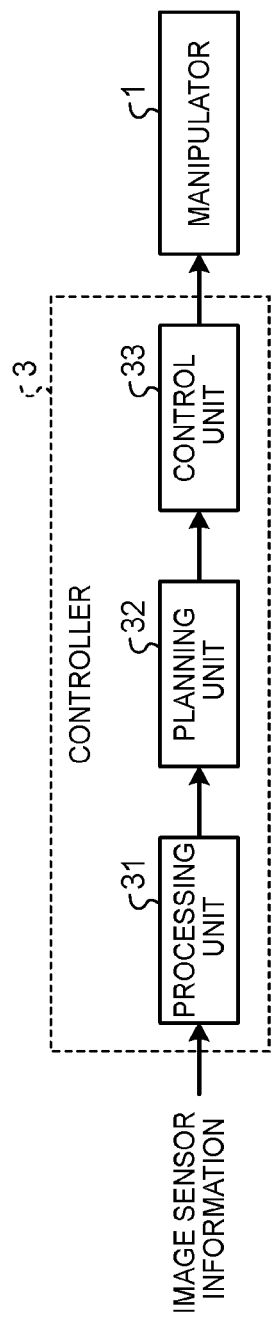

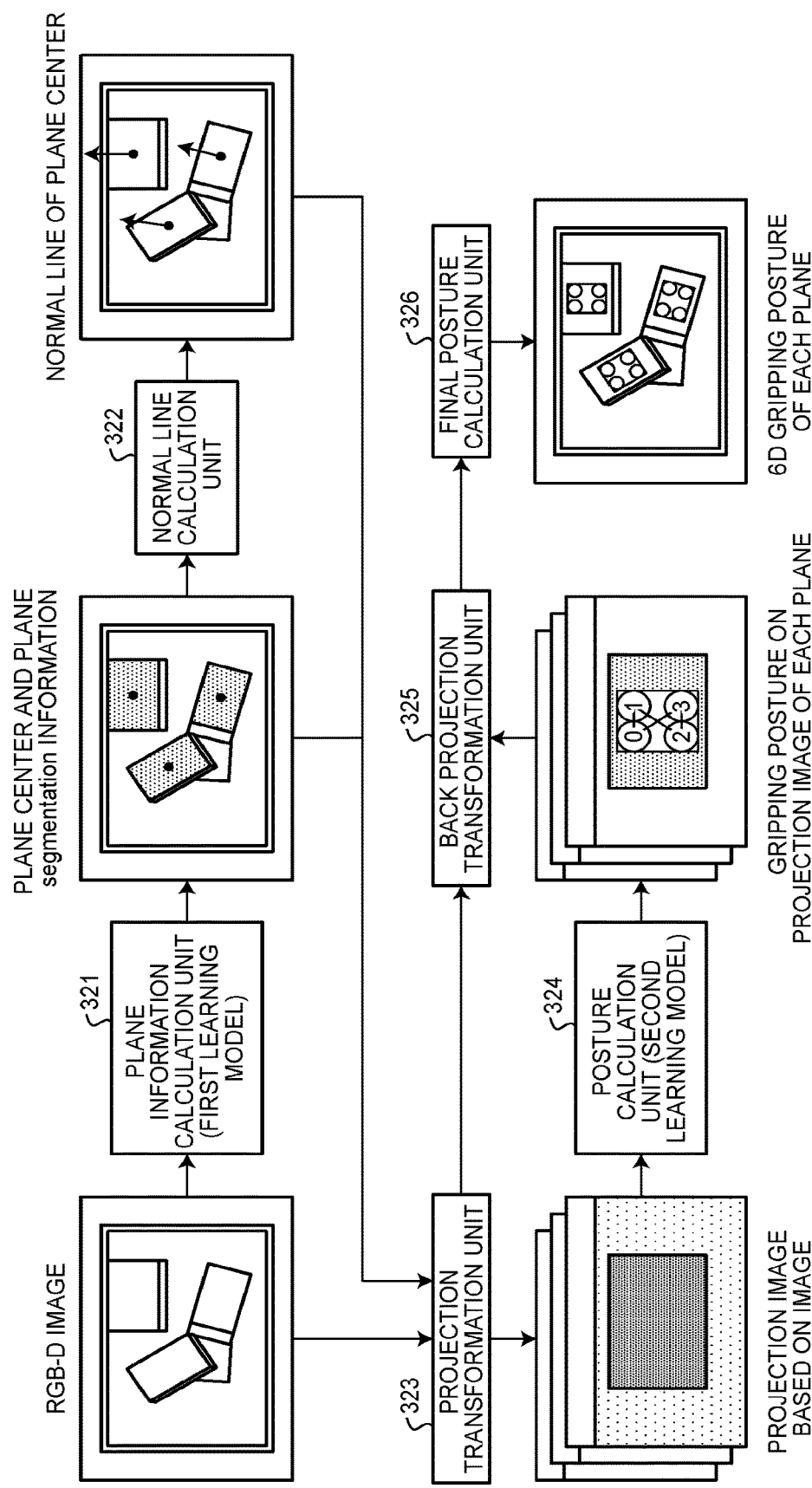

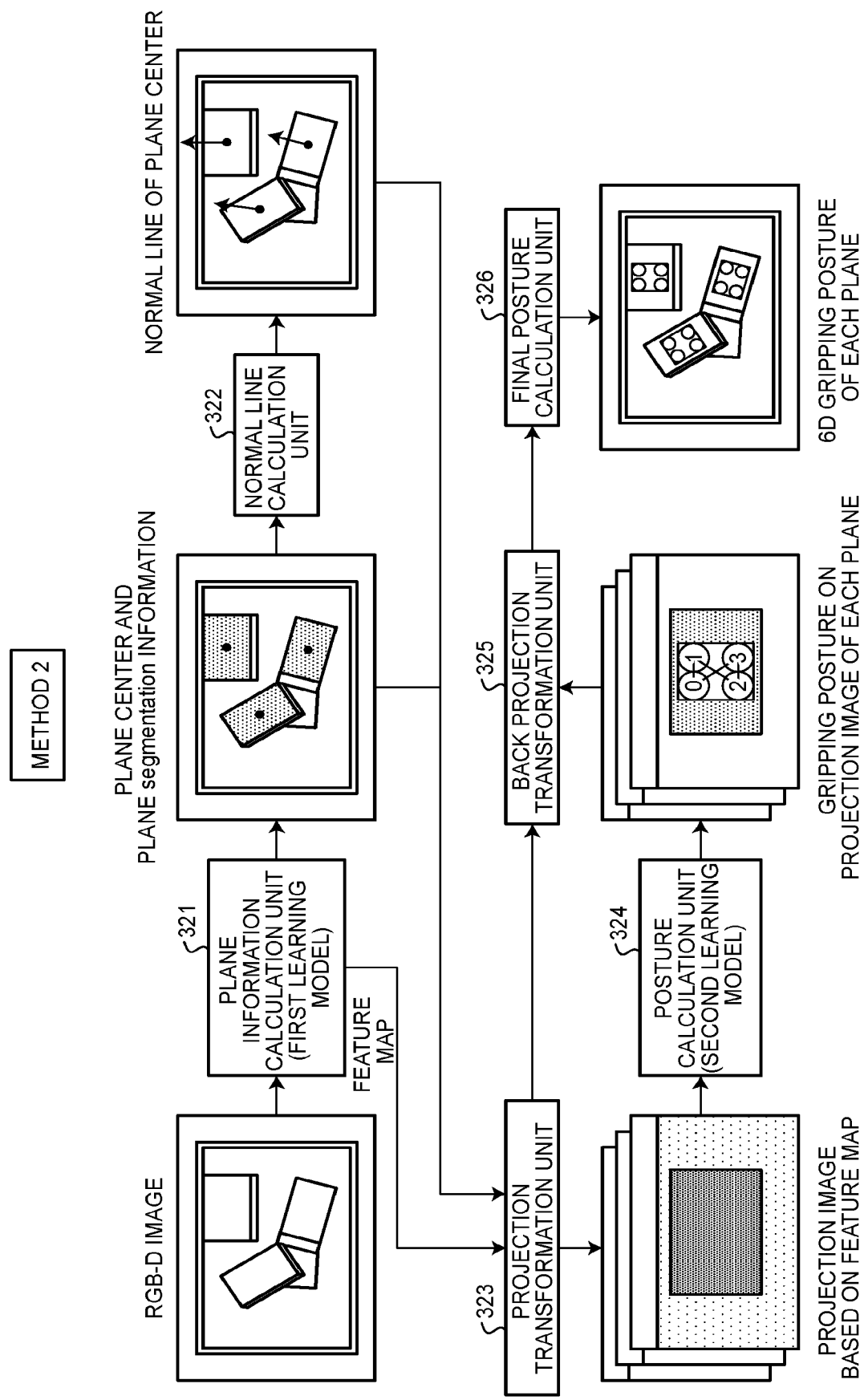

HANDLING APPARATUS, HANDLING METHOD, AND RECORDING MEDIUM

CROSS-REFERENCE TO RELATED APPLICATIONS

This application is based upon and claims the benefit of priority from Japanese Patent Application No. 2023-026861, filed on Feb. 24, 2023; the entire contents of which are incorporated herein by reference.

FIELD

Embodiments of the present disclosure relate generally to a handling apparatus, a handling method, and a recording medium.

BACKGROUND

There are known robot systems for automating handling work of objects, such as a picking automation system for handling packages loaded in bulk in a distribution warehouse. In such a robot system, a gripping position and posture of an object, or a placement position and posture for packing an object, are automatically calculated on the basis of sensor data including image information, and a robot with a gripping mechanism is controlled to pick and place the object.

In recent years, with development of the machine learning technology, a technique for achieving an appropriate operation of a robot by learning has been proposed.

However, the conventional technique has difficulty in more easily estimating posture for grasping and/or picking up a target object.

BRIEF DESCRIPTION OF THE DRAWINGS

FIG. 3 is a diagram illustrating an example of picking tool information according to the embodiment;

FIG. 4 is a diagram illustrating an example of a functional configuration of a controller according to the embodiment;

FIG. 6 is a diagram illustrating a processing example of a final posture calculation method-1 according to the embodiment;

FIG. 7 is a diagram illustrating a processing example of a final posture calculation method-2 according to the embodiment;

DETAILED DESCRIPTION

Figure 1:
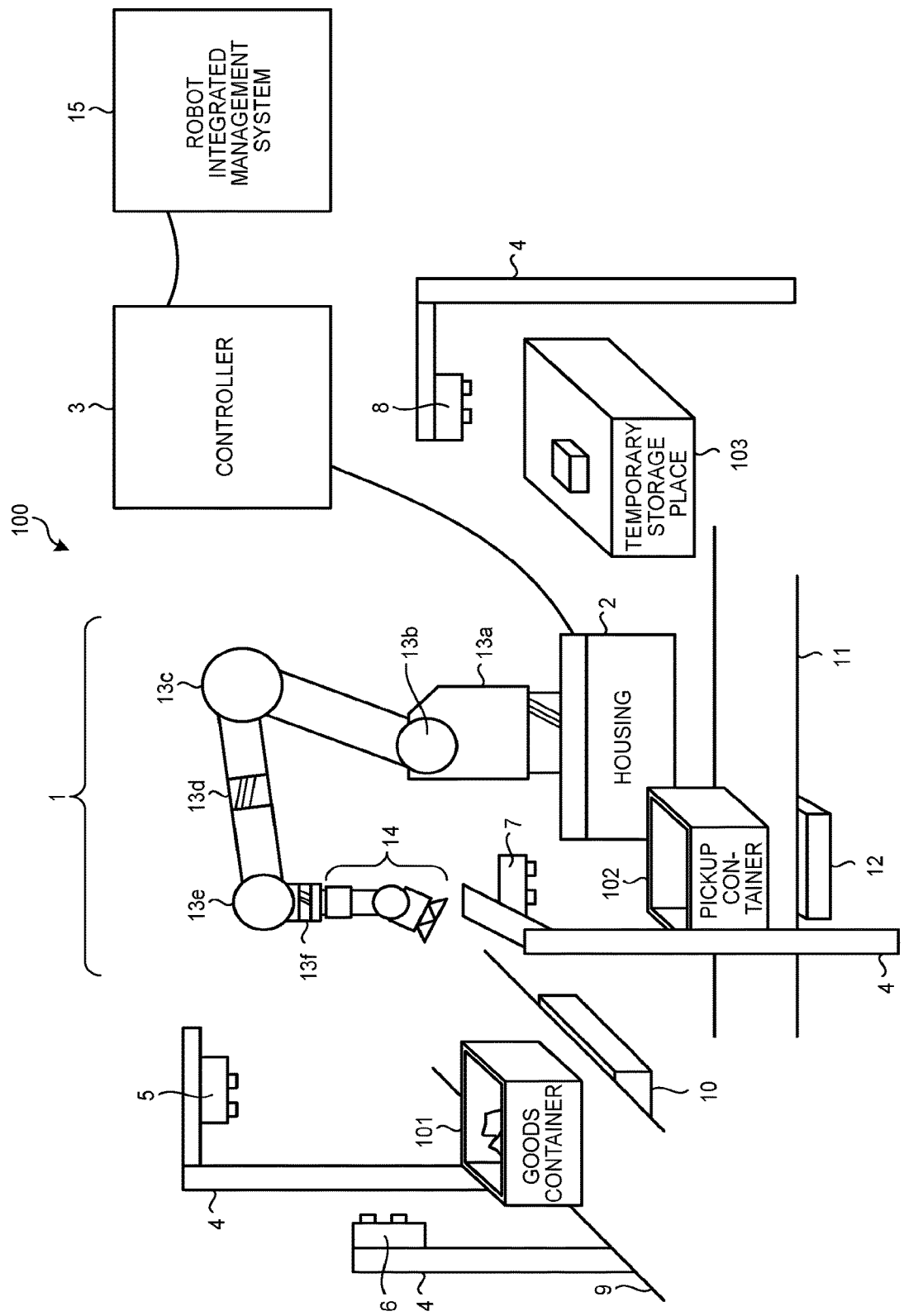
FIG. 1 is a diagram illustrating an example of a configuration of a handling system 100 according to an embodiment.

A handling apparatus according to one embodiment of the present disclosure includes a manipulator and a controller. The manipulator includes a picking tool for gripping a target object. The controller is configured to control behavior of the manipulator. The controller includes a hardware processor functioning as a surface information calculation unit, a projection transformation unit, a posture calculation unit, an inverse projection transformation unit, and a final posture calculation unit. The surface information calculation unit calculates surface information about a target object by using a first learning model for estimating the surface information about the target object from a feature map. The feature map represents a feature of an input image obtained from the input image in which the target object is captured. The projection transformation unit identifies, from the surface information, one or more surfaces included in the input image or the feature map, and transforms the input image or the feature map into one or more projection images or one or more projection feature maps, each can be regarded as one captured from a viewpoint translated along the normal vector direction of a certain surface. The posture calculation unit calculates a grasp posture for grasping the target object by using a second learning model for estimating the grasp posture. The grasp posture is calculated for each of the one or more projection images or the one or more projection feature maps. The inverse projection transformation unit transforms the grasp posture calculated for each of the one or more projection images or the one or more projection feature maps into a grasp posture in a first coordinate system. The final posture calculation unit calculates a final posture of the picking tool by projecting the grasp posture in the first coordinate system onto the input image or the feature map.

Hereinafter, an embodiment of a handling apparatus, a handling method, and a recording medium will be described in detail with reference to the accompanying drawings.

When handling a target object, it is conventionally assumed to grasp the target object from directly above. There are many cases where expression on an image for a grasp posture (for example, an angle between coordinates of a gripping position in an image and a horizontal axis of a grasp posture in the image) is estimated by a neural network on the basis of image information. However, in a case where objects are disorganized and in a heap that objects cannot be taken directly above, it is necessary to calculate a 6D posture in a world coordinate system that represents the space seen from the origin. A neural network has difficulty in estimating the 6D grasp postures of all target objects at once, and it has been necessary to design or learn a sampler of a gripping candidate postures (for example, Mousavian et al. (2019). 6-dof graspnet: Variational grasp generation for object manipulation. In Proceedings of the IEEE/CVF International Conference on Computer Vision (pp. 2901-2910)).

An outline of a handling system that includes a handling apparatus (picking robot) that is an example of an object handling robot and a robot integrated management system will be described first.

Overall Outline

FIG. 1 is a schematic diagram of a configuration of a handling system 100 according to the embodiment. The handling system 100 according to the embodiment includes a handling apparatus (a manipulator 1, a housing 2, and a controller 3), a sensor support part 4, a goods container sensor 5, a gripped goods measurement sensor 6, a pickup container sensor 7, a temporary storage place sensor 8, a goods container drawing part 9, a goods container weight scale 10, a pickup container drawing part 11, and a pickup container weight scale 12.

The sensor support part 4 supports the sensors (the goods container sensor 5, the gripped goods measurement sensor 6, the pickup container sensor 7, and the temporary storage place sensor 8).

The goods container sensor 5 measures the state inside a goods container 101. The goods container sensor 5 is, for example, an image sensor that is installed above the goods container drawing part 9.

The gripped goods measurement sensor 6 is installed near the goods container sensor 5, and measures an object gripped by the manipulator 1.

The pickup container sensor 7 measures the state inside a pickup container. The pickup container sensor 7 is, for example, an image sensor installed above the pickup container drawing part 11.

The temporary storage place sensor 8 measures goods placed at a temporary storage place 103.

The goods container drawing part 9 draws in the goods container 101 in which goods to be handled are stored.

The goods container weight scale 10 measures the weight of the goods container 101.

The pickup container drawing part 11 draws in a pickup container 102 that contains the goods taken out by the manipulator 1.

The pickup container weight scale 12 measures the weight of the pickup container 102.

Note that the goods container sensor 5, the gripped goods measurement sensor 6, the pickup container sensor 7, and the temporary storage place sensor 8 may be optional sensors. For example, sensors such as an RGB image camera, a distance image camera, a laser range finder, and Light Detection and Ranging, Laser Imaging Detection and Ranging (LiDAR) that can acquire image information, three-dimensional information, and so forth may be used.

Note that, although not illustrated in the schematic diagram of FIG. 1, the handling system 100 according to the embodiment includes a power supply unit that causes various sensors and various drive units to operate, a cylinder, a compressor, and a vacuum pump that store compressed air, external interfaces such as a controller and a User Interface (UI), and safety mechanisms such as a light curtain and a collision detector in addition to the above.

The manipulator 1 includes an arm part and a picking tool part 14.

The arm part is an articulated robot that is driven by a plurality of servo motors. The arm part is configured by a combination of a multiaxial vertical articulated robot whose typical example is a vertically articulated robot of six axes (axes 13a to 13f) as illustrated in FIG. 1, a scalar robot, a linear motion robot, and the like.

The picking tool (handling tool) part 14 is a mechanism that grips a target object by suction, jamming, pinching, and/or multiple fingering.

FIGS. 2A to 2D are diagrams illustrating the first to fourth examples of the picking tool part 14 according to the embodiment. As illustrated in FIGS. 2A to 2D, a drive unit for bending or rotation or various sensors may be disposed as end effectors of the handling apparatus.

Figure 2A:
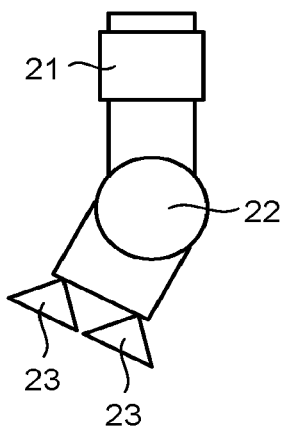
FIG. 2A is a diagram illustrating a first example of a picking tool part according to the embodiment.

In the first example in FIG. 2A, the picking tool part 14 includes a force sensor 21, a bending axis 22, and two or more suction pads 23. In the second and third examples in FIGS. 2B and 2C, the picking tool part 14 includes the force sensor 21 and the suction pad(s) 23. In the fourth example in FIG. 2D, the picking tool part 14 includes the force sensor 21 and a pinching mechanism 24.

Figure 2B:
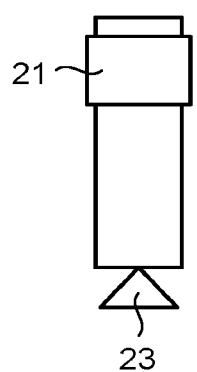
FIG. 2B is a diagram illustrating a second example of the picking tool part according to the embodiment.
Figure 2C:
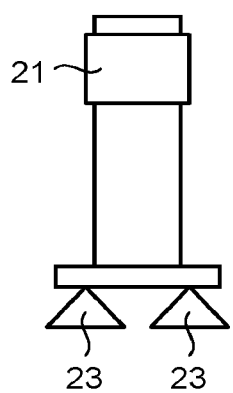
FIG. 2C is a diagram illustrating a third example of the picking tool part according to the embodiment.
Figure 2D:
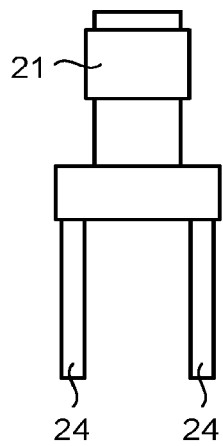
FIG. 2D is a diagram illustrating a fourth example of the picking tool part according to the embodiment.

As illustrated in FIGS. 2A to 2C, the picking tool parts 14 are each a suction-type picking tool, whereas they are different in the numbers, the shapes, and the positions of the suction pads. Moreover, as illustrated in FIG. 2D, the picking tool part 14 may be a pinching mechanism or a multiple fingering mechanism other than the suction type as in FIGS. 2A to 2C.

FIG. 3 is a diagram illustrating an example of picking tool information according to the embodiment. The picking tool information according to the embodiment includes a picking tool number, a type, joint information, the number of suction pads, suction pad information, a pinching index, pinching finger information, outer shape information, and characteristics information.

The picking tool number is a number used for identifying the picking tool part 14. The type represents a type of the picking tool part 14. The joint information is information on joints included in the picking tool part 14. The number of suction pads is the number of the suction pads 23 included in the picking tool part 14. The suction pad information is information on the suction pads 23 included in the picking tool part 14. The pinching index is the number of fingers of the pinching mechanism included in the picking tool part 14. The pinching finger information is information on fingers of the pinching mechanism included in the picking tool part 14. The outer shape information represents the outer shape of the picking tool part 14. The characteristics information represents characteristics of the picking tool part 14.

Returning to FIG. 1, a robot integrated management system 15 is a system that manages the handling system 100. The picking tool information in FIG. 3 is stored in a database of the robot integrated management system. The picking tool part 14 can be attached to and detached from the arm part by using a picking tool changer. The picking tool part 14 can be exchanged with an optional picking tool part in accordance with an instruction from the robot integrated management system 15.

FIG. 4 is a diagram illustrating an example of a functional configuration of the controller 3 according to the embodiment. The controller 3 according to the embodiment includes a processing unit 31, a planning unit 32, and a control unit 33.

The processing unit 31 processes sensor data such as image information acquired by the various sensors, and generates an input image such as an RGB-D image to be input to the planning unit 32. For example, the processing unit 31 performs noise cancellation processing on images captured by the camera, background removal processing, image resizing for generating images to be input to the planning unit 32, and normalization processing. The background removal processing includes processing of removing information on, for example, a goods container, the ground, or the like other than an object.

The planning unit 32 calculates a candidate group of postures at which it is highly probable that the handling tool can grasp the object, and a graspability score by a two-stage deep learning model. Moreover, the planning unit 32 generates control information including a trajectory from an initial posture of the manipulator 1 to a grasp posture that has a higher score or is optimal, and gives the control information to the control unit 33.

Until the gripping operation succeeds, the control unit 33 generates information on a position, a speed, and an acceleration of each joint of the manipulator 1 in time series on the basis of the control information sequentially received from the planning unit 32 in order to control behavior of the manipulator 1 to grasp the target object.

Figure 5:
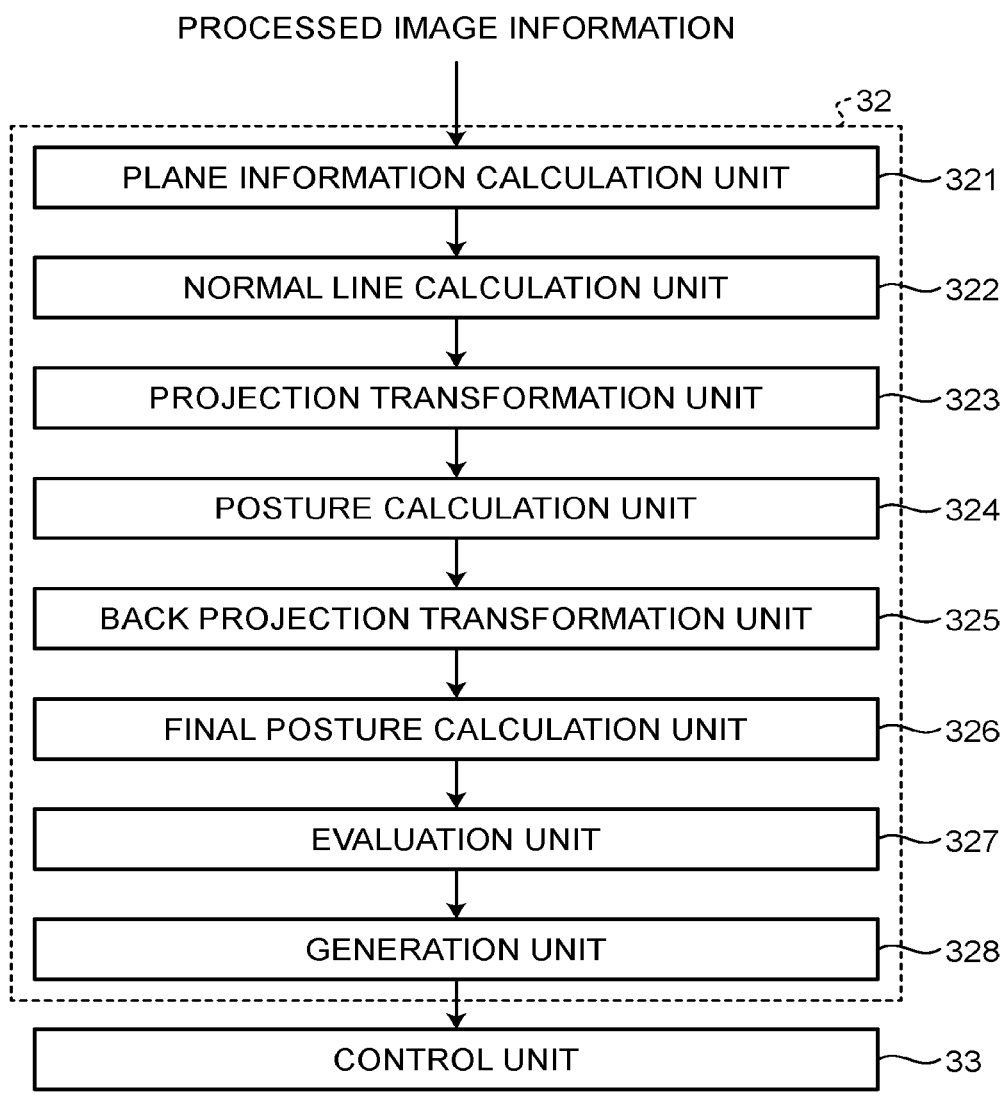
FIG. 5 is a diagram illustrating an example of a functional configuration of a planning unit according to the embodiment.

FIG. 5 is a diagram illustrating an example of a functional configuration of the planning unit 32 according to the embodiment. The planning unit 32 according to the embodiment includes a surface information calculation unit 321, a normal vector calculation unit 322, a projection transformation unit 323, a posture calculation unit 324, an inverse projection transformation unit 325, a final posture calculation unit 326, an evaluation unit 327, and a generation unit 328. The planning unit 32 performs two-stage learning and calculates a posture at which a target object can be grasped.

The surface information calculation unit 321 performs the first stage of learning (learning of a first learning model), and calculates surface information including a surface area and the position of one point on this surface. The surface area refers to, for example, an area of a plane or an area close to the plane. At the time of estimation, the surface information calculation unit 321 estimates the surface area on the basis of the first learning model, and calculates one point (for example, surface center) in the surface area. A convolutional neural network for area detection and feature point detection can be used for the first learning model. For example, key point mark Regions with CNN features (RCNN), You Only Look Once (YOLO), and the like, which are often used for object recognition or posture detection, are used as convolutional neural networks for area detection and feature point detection.

The normal vector calculation unit 322 calculates a normal vector at a point on the surface on the basis of the information about the surface area and a certain point on the surface. Specifically, first, the normal vector calculation unit 322 transforms a Depth image into a point cloud on the basis of a camera intrinsic matrix. Then, the normal vector calculation unit 322 extracts a point cloud of each surface from the surface area. The normal vector calculation unit 322 calculates a normal vector at one point on each surface, and the major axis and the minor axis of the surface area by using a Point Cloud Library (PCL) in the first coordinate system (for example, world coordinate system) on the basis of the point cloud of each surface and the information on the point on each surface.

The 6D grasp posture of the picking tool part 14 is defined by x, y, z, roll, pitch, and yaw. The values of x, y, and z indicate coordinates of the position of the picking tool part 14 in the above-described first coordinate system.

In a case where, for example, the first coordinate system is the world coordinate system that represents a space seen from the origin, the 6D grasp posture in the first coordinate system includes three-dimensional coordinates (x, y, z) indicating a position in the first coordinate system, an angle (roll) between an x axis of the first coordinate system and an X axis of the second coordinate system (for example, a local coordinate system based on coordinates of the picking tool), an angle (pitch) between a y axis of the first coordinate system and a Y axis of the second coordinate system, and an angle (yaw) between a z axis of the first coordinate system and a Z axis of the second coordinate system.

Generally, when an object is grasped by the picking tool part 14 (in particular, when the item is suctioned by the suction-type hand), the direction of the z axis of the picking tool part 14 is always opposite to the direction of the normal vector on the surface to be suctioned. Thus, roll and pitch can be determined by using a vector in the opposite direction of the normal vector calculated by the above-described normal vector calculation unit 322. Therefore, it is possible to calculate the 6D posture by only calculating the remaining parameters of x, y, z, and yaw.

FIG. 6 is a diagram illustrating a processing example of a final posture calculation method-1 according to the embodiment. FIG. 7 is a diagram illustrating a processing example of a final posture calculation method-2 according to the embodiment. According to the method-1 in FIG. 6, an RGB-D image is used for processing in the projection transformation unit 323 and the inverse projection transformation unit 325. According to the method-2 in FIG. 7, a feature map is used for processing in the projection transformation unit 323 and the inverse projection transformation unit 325.

The projection transformation unit 323 transforms the input RGB-D image (method-1) or the feature map of the image calculated by the above-described first learning model (method-2) into images each being seen from above a point on the surface (for example, a point at the center of the surface) in the normal vector direction calculated by the normal vector calculation unit. This projection transformation has two advantages.

The first advantage is that, the image or the feature map after projection transformation obtained by the transformation is regarded as an image captured by making the camera confront the surface. Therefore, the expression (FIGS. 8A and 8B) on the image of x, y, z, and yaw in the image or the feature map can be learned, so that it becomes easy for the posture calculation unit 324 to perform learning (learning of the second learning model).

The second advantage is that, the image after each projection transformation simply includes one target object surface, and attention is paid only to learning of a grasp posture of the one target object surface instead of all objects in an image. Therefore, it becomes easier for the posture calculation unit 324 to perform learning (learning of the second learning model).

More specifically, the projection transformation is performed by using the following calculation formulas (1) to (7).

$$p_4 = T_{translation} T_{projection}^{-1} T_{camera} p_3 \tag{1}$$

$$T_{projection} = \begin{bmatrix} n_{x0} & n_{y0} & n_{z0} & x_{plane} \\ n_{x1} & n_{y1} & n_{z0} & y_{plane} \\ n_{x2} & n_{y2} & n_{z2} & z_{plane} \\ 0 & 0 & 0 & 1 \end{bmatrix} \tag{2}$$

$$T_{translation} = \begin{bmatrix} 1 & 0 & 0 & 0 \\ 0 & 1 & 0 & 0 \\ 0 & 0 & 1 & \text{offset} \\ 0 & 0 & 0 & 1 \end{bmatrix} \tag{3}$$

$$T_{camera} = \begin{bmatrix} R_{00} & R_{01} & R_{02} & x_{cam} \\ R_{10} & R_{11} & R_{12} & y_{cam} \\ R_{20} & R_{21} & R_{22} & z_{cam} \\ 0 & 0 & 0 & 1 \end{bmatrix} \tag{4}$$

$$IC = \begin{bmatrix} c_x & 0 & f_x \\ 0 & c_y & f_y \\ 0 & 0 & 1 \end{bmatrix} \tag{5}$$

-continued $$u_{p4} = f_x \frac{p_{4\_x}}{p_{4\_z}} + c_x \quad (6)$$

$$v_{p4} = f_y \frac{p_{4\_y}}{p_{4\_z}} + c_y \quad (7)$$

$p_3$ denotes a point cloud in a third coordinate system (for example, camera coordinate system) before transformation. $p_4$ denotes a point cloud in a fourth coordinate system (for example, a coordinate system of a certain surface) after transformation. $T_{camera}$ denotes a matrix consisting of a first coordinate system position ($x_{cam}$, $y_{cam}$, $z_{cam}$) and a posture (R) of the camera.

$T^{-1}_{projection}$ denotes a projection transformation matrix that transforms the point cloud from the third coordinate system into the fourth coordinate system. $T^{-1}_{projection}$ includes a point position ($x_{surface}$, $y_{surface}$, $z_{surface}$) on a surface in the first coordinate system of the surface obtained by the above-described surface information calculation unit 321 and normal vector calculation unit 322, a vector nx ($n_{x0}$, $n_{x1}$, $n_{x2}$) of the major axis of the surface, a vector ($n_{y0}$, $n_{y1}$, $n_{y2}$) of the minor axis of the surface, and a normal vector ($n_{z0}$, $n_{z1}$, $n_{z2}$) at a point on the surface.

$T_{translation}$ denotes a matrix that adds an offset amount (offset) in the normal vector direction of the surface. $T_{translation}$ makes it possible to transform coordinate values $p_3$ in the third coordinate system of the point cloud into the point cloud seen from above the point on each surface in the normal vector direction, that is, coordinate values $p_4$ in the fourth coordinate system of the point cloud. Moreover, it is possible to easily transform the point cloud into coordinates ($u_{p4}$, $v_{p4}$) in a fifth coordinate system (an image coordinate system of the projected image or the feature map) by the camera matrix (IC), and then generate the projection image. $p_{4\_x}$, $p_{4\_y}$, and $p_{4\_z}$ denote x, y, and z coordinate values of $p_4$, respectively.

The projection transformation unit 323 creates, on the basis of the above-described surface information, a projection transformation matrix for transforming the third coordinate system into the fourth coordinate system. The third coordinate system indicates camera coordinates of the camera that has captured the input image. The fourth coordinate system is a coordinate system of each of one or more surfaces. Then, the projection transformation unit 323 acquires the projection image by performing projection transformation on the input image or the feature map with the projection transformation matrix, and calculates coordinate values in the fifth coordinate system being a coordinate system of the projection image or the projection feature map.

The posture calculation unit 324 performs the second stage of learning (learning of the second learning model), and calculates the projection image of the grasp posture, that is, an expression in the above-described fifth coordinate system.

Figure 8A:
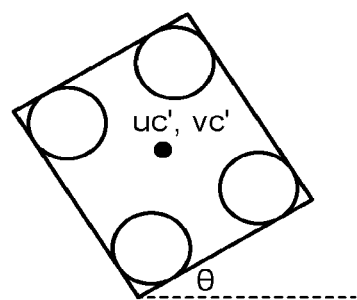
FIG. 8A is a diagram illustrating a first example (in a case of a suction type) of an expression of a grasp posture on a projection image according to the embodiment.
Figure 8B:
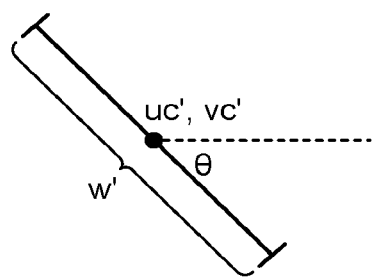
FIG. 8B is a diagram illustrating a second example (in a case of a gripping type) of an expression of a grasp posture on the projection image according to the embodiment.

FIG. 8A is a diagram illustrating a first example (a case of the suction type) of an expression of a grasp posture on a projection image according to the embodiment. FIG. 8B is a diagram illustrating a second example (a case of the gripping type) of an expression of a grasp posture on a projection image according to the embodiment. The expression of the grasp posture on the projection image includes a position (uc', vc'), an angle (θ) between a vector projected on the projection image of the x axis of the picking tool part 14 and an image horizontal axis, and an opening width of the picking tool part 14 (w'; only the pinching-type picking tool part 14 (see FIG. 8B)).

The second learning model uses a neural network (for example, a backbone+Fully connected layer that calculates a feature) that directly regresses uc', vc', θ, and w' or uses a neural network (for example, faster rcnn with rotated rpn) that can calculate a rotated bounding box.

The posture calculation unit 324 estimates a graspability score of the grasp posture. Although the point (for example, surface center) on the surface can be calculated by the first learning model, gripping is not necessarily possible at that point.

Figure 9:
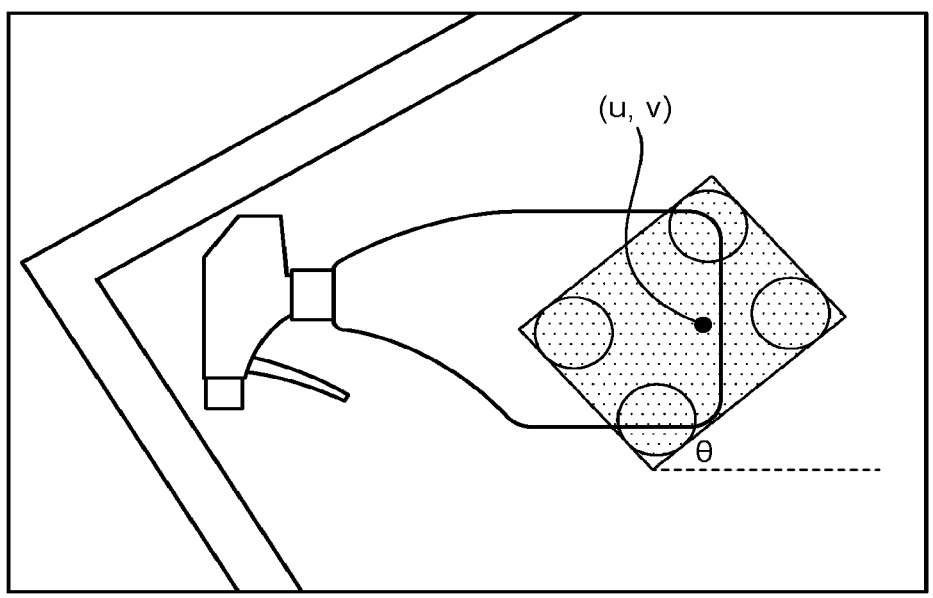
FIG. 9 is a diagram illustrating an example of a suctioning/grasp posture according to the embodiment.

FIG. 9 is a diagram illustrating an example of a suctioning/grasp posture according to the embodiment. In a case where, for example, the point on the surface calculated by the first learning model is the surface center, and the surface of a suctioning/gripping target object is small as in the example in FIG. 9, the areas of all the four suction pads cannot be overlaid on the surface of the suctioning/gripping target object. In the example in FIG. 9, there is only one suction pad whose suction pad area entirely overlaps the surface of the suctioning/gripping target object among the suction pads, so that the gripping position is not the surface center. Moreover, there may be a case where there is a high risk that the hand collides with a wall of a storage place (bin) of a target object when the surface center is adopted as the grasp position of the hand. Thus, the surface center cannot always be adopted as the grasp position. Therefore, the point on the surface calculated by the first learning model cannot be used as it is as the gripping position in some cases. It is necessary to learn the grasp position by using the second learning model.

The inverse projection transformation unit 325 transforms the grasp posture on the projection image calculated by the above-described second learning model (FIG. 6) or the projected feature map (FIG. 7) into the position posture in the above-described first coordinate system. More specifically, first, the inverse projection transformation unit 325 can transform an optional one point (u', v') in the projection image into the third coordinate system (x', y', z') where $p_3$ is located according to f(u', v') of following equation (8).

$$x', y', z' = f(u', v') \quad (8)$$

A transformation function f is expressed by following equation (9).

$$z' = \text{offset} \quad (9)$$
$$x' = \frac{u' - c_x}{f_x} \text{offset}$$
$$y' = \frac{c' - c_y}{f_y} \text{offset}$$

The x axis on the projection image of the picking tool part 14 or the x axis on the feature map can be expressed by two points of (uc', vc') and (uc'+cos θ, vc'+sin θ). An end point of a line segment of w' can be expressed by two points of (uc'−0.5 w' cos θ, vc'+0.5 w' sin θ) and (uc'+0.5 w' cos θ, vc'−0.5 w' sin θ). Hence, the inverse projection transformation unit 325 transforms the position (uc', vc') in the expression of the grasp posture on the projection image into the third coordinate system where $p_3$ is located according to f (u', v') in above equation (8), and thereby obtains a position (xc', yc', zc') of the grasp posture in the third coordinate system where $p_3$ is located (following equation (10)). Moreover, the inverse projection transformation unit 325 transforms the expression with the two points of the above x axis into the third coordinate system where $p_3$ is located according to f(u', v') of above equation (8), and thereby obtains a vector (nx') of the x axis in the third coordinate system where $p_3$ is located (the following equation (11)).

$$xc', yc', zc' = f(uc', vc') \qquad (10)$$

$$nx' = f(uc' + \cos\theta, vc' + \sin\theta) - f(uc', vc') \qquad (11)$$

The z axis of the hand is (0, 0, −1) in the third coordinate system where $p_3$ is located. Thus, a vector (ny') of the y axis is obtained by taking an outer product of (0, 0, −1) and nx'. As a result, the inverse projection transformation unit 325 calculates a matrix ($T'_{hand}$) of the grasp posture of the hand in the third coordinate system where $p_3$ is located according to the following equation (12).

$$T'_{hand} = \begin{bmatrix} nx' & nz' \times nx' & nz' & f(uc', vc') \\ 0 & 0 & 0 & 1 \end{bmatrix} \qquad (12)$$

The inverse projection transformation unit 325 calculates the grasp posture in the above-described first coordinate system in accordance with the following equation (13).

$$T_{hand} = T^{-1}_{translation} T_{projection} T'_{hand} \qquad (13)$$

As described above, the inverse projection transformation unit 325 calculates the inverse projection transformation matrix expressed by the equation (13) on the basis of the above-described projection transformation matrix $T^{-1}_{projection}$ and the grasp posture calculated for one or more projection images. Then, the inverse projection transformation unit 325 transforms the grasp posture represented by the fifth coordinate system into the grasp posture represented by the first coordinate system.

The final posture calculation unit 326 projects the grasp posture in the above-described first coordinates into the RGB-D image input to the planning unit 32, and calculates an expression of the posture of the picking tool part 14 on the image. In the case of, for example, the suction-type picking tool part 14 including the plurality of suction pads 23, the final posture calculation unit 326 performs an AND operation between an area of an expression of the posture on the image and an area of the surface obtained by the first learning model. Then, the final posture calculation unit 326 determines that the suction pad 23 to be applied to the surface area is ON, and determines that the suction pad 23 not to be applied to the surface area is OFF.

Note that the final posture calculation unit 326 may perform the AND operation between the area of the expression of the posture on the image and the area of the surface obtained by the first learning model on the above-described projection image or feature map, instead of on the RGB-D image.

Moreover, the final posture calculation unit 326 checks an interference with surrounding objects at the time of gripping at each grasp posture, and excludes grasp postures interfering with the surrounding objects from grasp posture candidates.

When there are more than one grasp posture candidates, the evaluation unit 327 evaluates priority among the grasp posture candidates. For example, the priority is evaluated by using evaluation indices obtained by integrally taking into account the shape and the position of a surface that can be gripped, the graspability score of the grasp posture of each picking tool part 14 estimated by the above-described second learning model, a change time of the picking tool part 14, etc.

The generation unit 328 generates control information including a trajectory from an initial posture of the manipulator 1 to a grasp posture of the picking tool part 14 that has a higher score or is optimal by using a route plan surfacer such as MoveIt, and gives the control information to the control unit 33.

Figure 10:
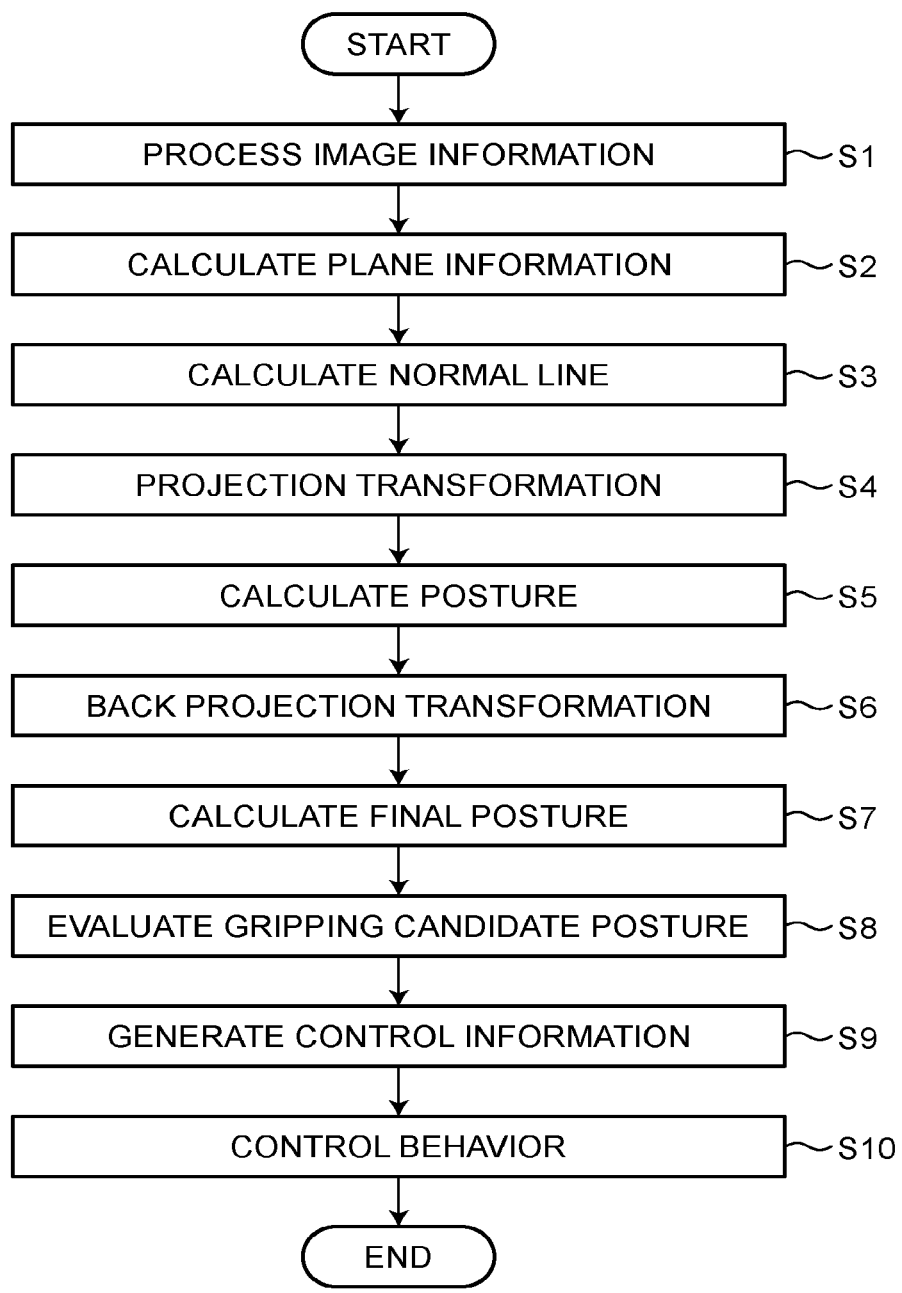
FIG. 10 is a flowchart illustrating an example of a handling method of the embodiment.

FIG. 10 is a flowchart illustrating an example of the handling method according to the embodiment. First, the processing unit 31 processes sensor data such as image information, and generates an input image such as an RGB-D image to be input to the planning unit 32 (step S1). Next, the surface information calculation unit 321 calculates surface information including a surface area and a position of a point on this surface by using the first learning model (step S2).

Next, the normal vector calculation unit 322 calculates a normal vector representing a normal vector at the point on the surface on the basis of information about the surface area and the point on the surface (step S3). Next, the projection transformation unit 323 transforms the RGB-D image generated in step S1 (method-1) or the feature map of the image calculated by the above-described first learning model (method-2) into images seen from above the point on each surface in the normal vector direction (step S4).

Next, the posture calculation unit 324 calculates a projection image of a grasp posture, that is, the projection image representing expression in the above-described fifth coordinate system (projection image coordinate system) by using the second learning model (step S5). Next, the inverse projection transformation unit 325 transforms the grasp posture on the projection image calculated by the above-described second learning model (FIG. 6) or the feature map (FIG. 7) into a position posture in the above-described first coordinate system (step S6).

The final posture calculation unit 326 calculates a final posture (step S7). More specifically, the final posture calculation unit 326 projects the grasp posture at the above-described first coordinates onto the RGB-D image input to the planning unit 32, and calculates an expression of the posture of the picking tool part 14 on the image as a grasp posture candidate. In a case where there are more than one grasp posture candidates, the evaluation unit 327 evaluates a priority of the grasp posture candidates (step S8).

The generation unit 328 generates control information including a trajectory from the initial posture of the manipulator 1 to a grasp posture of the picking tool part 14 that has a higher score or is optimal, by using the route plan surfacer such as MoveIt (step S9). The control unit 33 controls behavior of the manipulator 1 to grip the target object, on the basis of the control information generated in step S9 (step S10). In one example, the control unit 33 performs the control of behavior of the manipulator 1 by transmitting, to the manipulator 1, a control signal corresponding to the above-described control information.

As described above, in the handling apparatus (including the manipulator 1, the housing 2, and the controller 3) according to the embodiment, the surface information calculation unit 321 calculates surface information about a target object by using the first learning model for estimating the surface information about the target object from a feature map. The feature map represents an input image obtained from the input image in which the target object is captured. The projection transformation unit 323 identifies, from the surface information, one or more surfaces included in the input image or the feature map. The projection transformation unit 323 then transforms the input image or the feature map into one or more projection images or one or more projection feature maps, each being seen from above a point on each of the one or more surfaces in the normal vector direction. The posture calculation unit 324 calculates a grasp posture for gripping the target object, by using the second learning model for estimating the grasp posture. The grasp posture is calculated for each of the one or more projection images or the one or more projection feature maps. The inverse projection transformation unit 325 transforms the grasp posture calculated for each of the one or more projection images or the one or more projection feature maps into a grasp posture in the first coordinate system. The final posture calculation unit 326 calculates a final posture of the picking tool part 14 by projecting the grasp posture in the first coordinate system onto the input image or the feature map.

With the configuration according to the embodiment, it is possible to more easily estimate the posture for grasping and/or picking up the target object.

An example of a diagram illustrating an example of a hardware configuration of the controller 3 according to the embodiment will be described.

Example of Hardware Configuration

Figure 11:
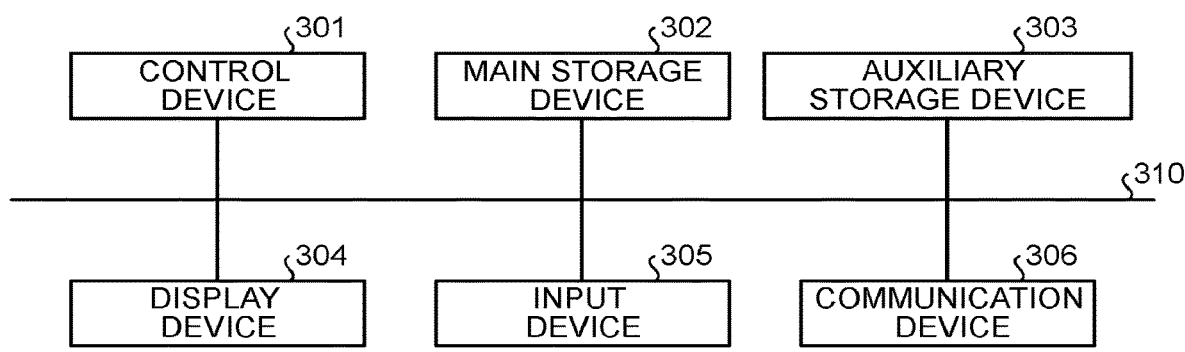
FIG. 11 is a diagram illustrating an example of a hardware configuration of the controller according to the embodiment.

FIG. 11 is a diagram illustrating an example of the hardware configuration of the controller 3 according to the embodiment. The controller 3 includes a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected via a bus 310.

Note that the display device 304, the input device 305, and the communication device 306 may not be provided. For example, in a case where the controller 3 is connected to an external apparatus, a display device, an input device, and a communication device of the external apparatus may be utilized.

The control device 301 executes a computer program read from the auxiliary storage device 303 onto the main storage device 302. The control device 301 is configured by, for example, one or more processors such as CPUs. The main storage device 302 is a memory such as a Read Only Memory (ROM) and a RAM. The auxiliary storage device 303 is a memory such as a memory card, a Hard Disk Drive (HDD), etc.

The display device 304 displays information. The display device 304 is, for example, a liquid crystal display. The input device 305 receives an input of information. The input device 305 is, for example, a hardware key or the like. Note that the display device 304 and the input device 305 may be liquid crystal touch panels or the like that have both of a display function and an input function. The communication device 306 communicates with other apparatuses.

Computer programs executed by the controller 3 are each stored as a file of an installable format or an executable format in a computer-readable storage medium such as a CD-ROM, a memory card, a CD-R, and a Digital Versatile Disc (DVD), and may be provided as a computer program product.

Moreover, there may be employed a configuration where the programs executed by the controller 3 are stored in a computer connected to a network such as the Internet, downloaded via the network, and thereby provided. Moreover, there may be employed a configuration where the programs executed by the controller 3 may be provided via the network such as the Internet without being downloaded.

Moreover, there may be employed a configuration where the programs executed by the controller 3 may be installed in a ROM or the like in advance and provided.

The programs executed by the controller 3 employ a module configuration that includes functions that can be implemented by the programs among the functions of the controller 3.

The functions implemented by the programs are loaded to the main storage device 302 when the control device 301 reads the programs from a storage medium such as the auxiliary storage device 303 and executes the programs. That is, the functions implemented by the programs are generated on the main storage device 302.

Note that part of the functions of the controller 3 may be implemented by hardware such as an IC. The IC is, for example, a processor that executes dedicated processing.

Moreover, in a case where each function is implemented by a plurality of processors, each processor may implement one of the functions, or may implement two or more of the functions.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A handling apparatus comprising:
   a manipulator including a picking tool for gripping a target object; and
   a controller configured to control behavior of the manipulator, the controller including a hardware processor functioning as
   a surface information calculation unit to calculate surface information about a target object by using a first learning model for estimating the surface information about the target object from a feature map, the feature map representing a feature of an input image obtained from the input image in which the target object is captured,
   a projection transformation unit to
      identify, from the surface information, one or more surfaces included in the input image or the feature map, and
      transform the input image or the feature map into one or more projection images or one or more projection feature maps, each being seen from above a point on each of the one or more surfaces in a normal vector direction,
   a posture calculation unit to calculate a grasp posture for gripping the target object by using a second learning model for estimating the grasp posture, the grasp posture being calculated for each of the one or more projection images or the one or more projection feature maps;

an inverse projection transformation unit to transform the grasp posture calculated for each of the one or more projection images or the one or more projection feature maps into a grasp posture in a first coordinate system, and a final posture calculation unit to calculate a final posture of the picking tool by projecting the grasp posture in the first coordinate system onto the input image or the feature map.

2. The handling apparatus according to claim 1, wherein the first coordinate system is a world coordinate system representing a space seen from an origin, and the grasp posture in the first coordinate system includes three-dimensional coordinates indicating a position in the first coordinate system, an angle between an x axis of the first coordinate system and an X axis of a second coordinate system, the second coordinate system being a coordinate system on which local coordinates based on the picking tool are indicated, an angle between a y axis of the first coordinate system and a Y axis of the second coordinate system, and an angle between a z axis of the first coordinate system and a Z axis of the second coordinate system.

3. The handling apparatus according to claim 1, wherein the projection transformation unit acquires each of the one or more projection images by performing processing of:

creating, on the basis of the surface information, a projection transformation matrix for transforming a third coordinate system into a fourth coordinate system, the third coordinate system indicating camera coordinates of a camera having captured the input image, the fourth coordinate system being a coordinate system of each of the one or more surfaces;

performing projection transformation on the input image or the feature map by using the projection transformation matrix; and calculating coordinate values in a fifth coordinate system being a coordinate system of the one or more projection images or the one or more projection feature maps.

4. The handling apparatus according to claim 3, wherein the inverse projection transformation unit transforms a grasp posture represented by the fifth coordinate system into a grasp posture represented by the first coordinate system by calculating an inverse projection transformation matrix on the basis of the projection transformation matrix and the grasp posture calculated for the one or more projection images.

5. The handling apparatus according to claim 1, wherein the picking tool includes a plurality of suction pads, and the final posture calculation unit performs an AND operation between an final posture area in the input image or the feature map and a surface area identified from the surface information, the final posture area representing the final posture of the picking tool, and determines that a suction pad to be applied to the surface area is ON and a suction pad not to be applied to the surface area is OFF.

6. A handling method implemented by a computer controlling behavior of a manipulator including a picking tool for gripping a target object, the handling method comprising:

calculating surface information about a target object by using a first learning model for estimating the surface information about the target object from a feature map, the feature map representing a feature of an input image obtained from the input image in which the target object is captured;

identifying, from the surface information, one or more surfaces included in the input image or the feature map, and transforming the input image or the feature map into one or more projection images or one or more projection feature maps, each being seen from above a point on each of the one or more surfaces in a normal vector direction;

calculating a grasp posture for gripping the target object by using a second learning model for estimating the grasp posture, the grasp posture being calculated for each of the one or more projection images or the one or more projection feature maps;

transforming the grasp posture calculated for each of the one or more projection images or the one or more projection feature maps into a grasp posture in a first coordinate system; and calculating a final posture of the picking tool by projecting the grasp posture in the first coordinate system onto the input image or the feature map.

7. A non-transitory computer-readable recording medium on which programmed instructions are recorded, the instructions causing a computer to execute processing, the computer controlling behavior of a manipulator including a picking tool for gripping a target object, the processing to be executed by the computer comprising:

calculating surface information about a target object by using a first learning model for estimating the surface information about the target object from a feature map, the feature map representing a feature of an input image obtained from the input image in which the target object is captured;

identifying, from the surface information, one or more surfaces included in the input image or the feature map, and transforming the input image or the feature map into one or more projection images or one or more projection feature maps, each being seen from above a point on each of the one or more surfaces in a normal vector direction;

calculating a grasp posture for gripping the target object by using a second learning model for estimating the grasp posture, the grasp posture being calculated for each of the one or more projection images or the one or more projection feature maps;

transforming the grasp posture calculated for each of the one or more projection images or the one or more projection feature maps into a grasp posture in a first coordinate system; and calculating a final posture of the picking tool by projecting the grasp posture in the first coordinate system onto the input image or the feature map.

* * * * *